April 5, 1955
B. HATCHER
2,705,383
FISHING DEVICE
Filed Sept. 28, 1953
2 Sheets-Sheet 1
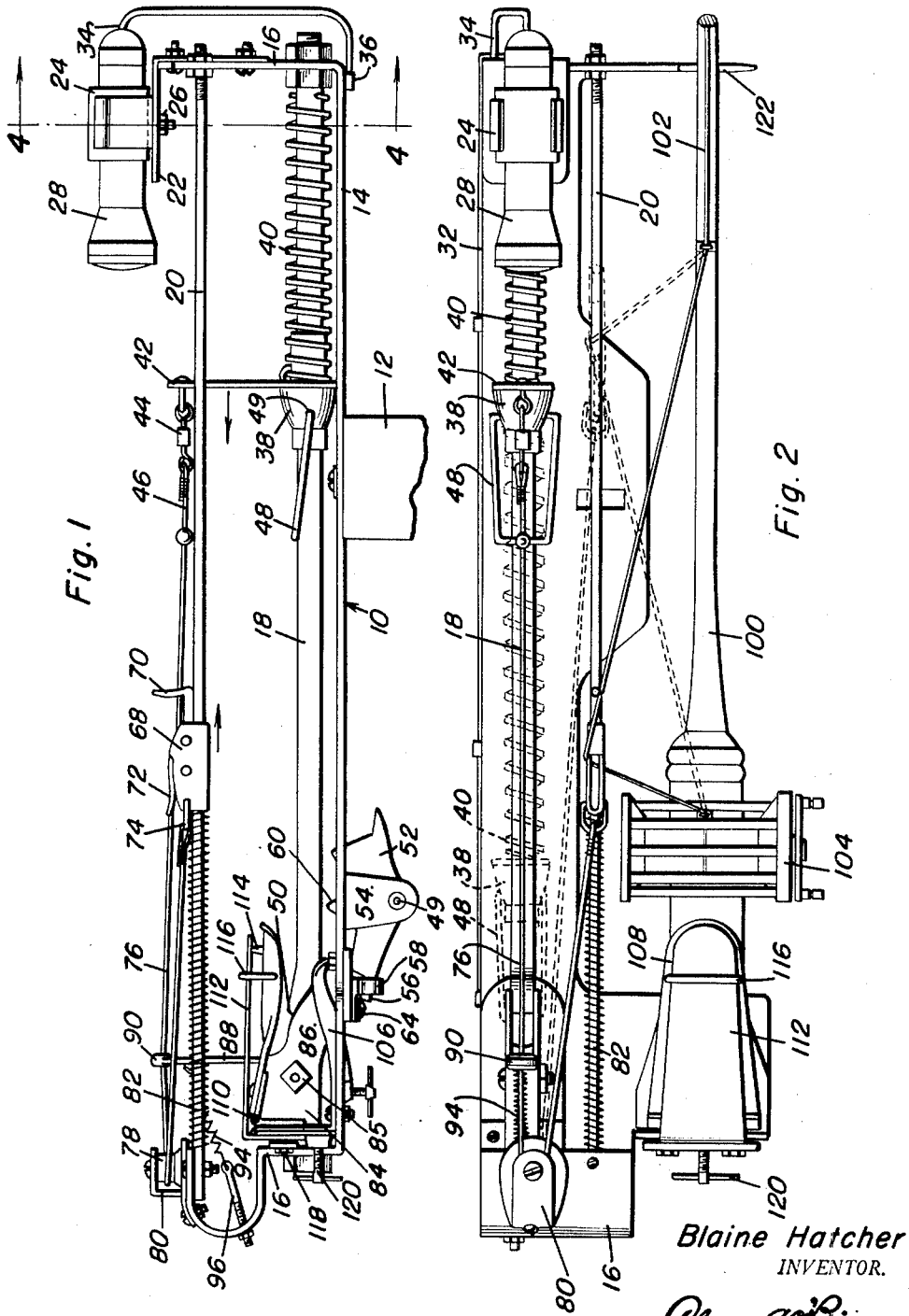
Blaine Hatcher
INVENTOR.

April 5, 1955   B. HATCHER   2,705,383
FISHING DEVICE
Filed Sept. 28, 1953   2 Sheets-Sheet 2
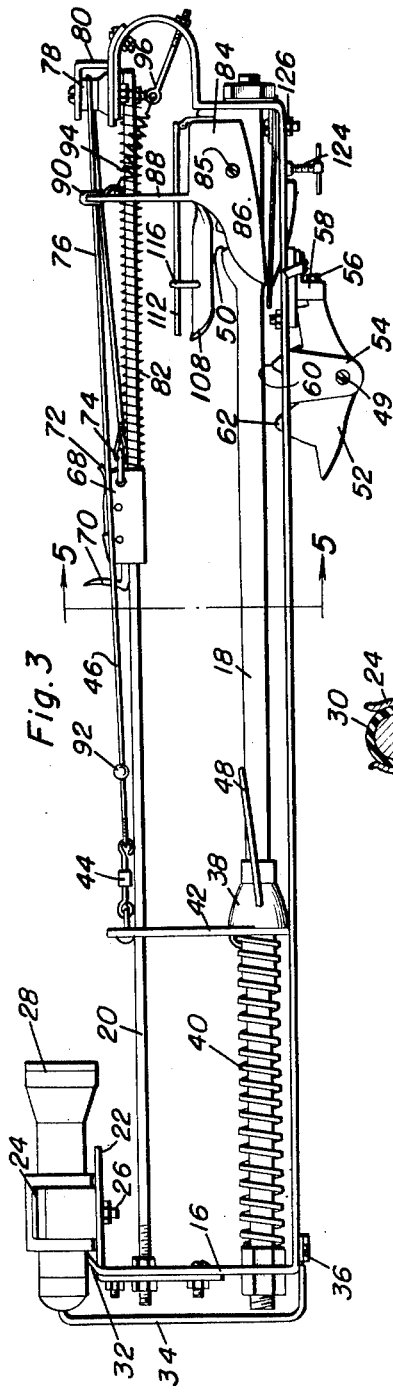
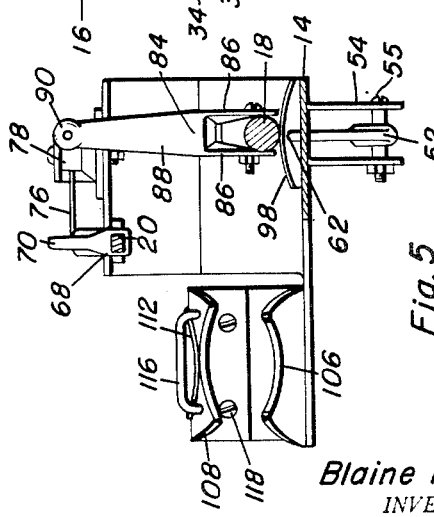
Blaine Hatcher
INVENTOR.
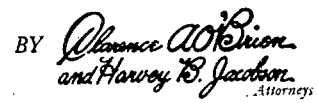
Attorneys

# United States Patent Office 2,705,383
Patented Apr. 5, 1955

2,705,383

FISHING DEVICE

Blaine Hatcher, Kremlin, Okla.

Application September 28, 1953, Serial No. 382,653

5 Claims. (Cl. 43—16)

This invention relates to a fishing device and more specifically provides a device for use in conjunction with a fishing rod wherein the fishing line is jerked thereby setting the hook into the fish and simultaneously closing a light circuit for notifying a fisherman that a fish has been caught.

An object of this invention is to provide a fishing device having a novel means for actuating the fishing line for setting the fishing hook into the fish.

Another object of this invention is to provide a fishing device having means for holding a fishing rod and a fishing line holding means wherein the action of the fish on the line releases the line holding means wherein the line is quickly retracted.

Yet another object of this invention is to provide a fishing device as described wherein a flashlight is actuated upon the movement of the line holding member, thereby signalling the fisherman that a fish is on the hook.

A still further object of this invention is to provide a fishing device which is simple in construction, easy in operation, well designed for the purposes intended and inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of the fishing device of this invention;

Figure 2 is a top plan view of the fishing device of this invention with the fishing rod and line in position;

Figure 3 is a side elevation of the fishing device similar to Figure 1, but taken from the opposite side of the fishing device;

Figure 4 is a transverse, vertical section taken substantially along section line 4—4 of Figure 1;

Figure 5 is a transverse, vertical section taken substantially along section line 5—5 of Figure 3; and, Figure 6 is a detailed side view with fragments in section showing the latch member and the device in operative or set position.

Referring now specifically to the drawings, it will be seen that the numeral 10 generally designates the fishing device of this invention mounted upon a suitable support 12 which may be any part of a boat or pier.

The fishing device 10 generally comprises a base member 14 having upturned end portions 16 and a pair of vertically spaced horizontal guides 18 and 20 are positioned between the upstanding end portions 16 in spaced relation to the base 14 with the guide rod 20 located above and offset from the guide rod 18. One upturned end member 16 is provided with a horizontal member 22 having a U-shaped clip 24 secured on the upper surface thereof by a suitable fastening member 26 and a flashlight 28 is positioned in the clip 24 and the flashlight is provided with suitable insulation 30 around the conventional switch thereon with an electrical lead 32 projecting therefrom and a second electrical lead 34 projecting from the rear portion of the flashlight and grounded to the base 12 by a suitable clip 36. The electrical lead 32 passes horizontally along one edge of the base 12 for a purpose described hereinafter.

A slidable member 38 is positioned on the horizontal guide rod 18, and a coil spring 40 is secured to the slidable member 38 and the remote end of the horizontal guide rod 18 adjacent the flashlight 28 wherein the slidable member 38 is urged towards the flashlight member 28. An upstanding member 42 on the slidable member 38 is provided with a suitable fastener 44 connecting the upstanding portion 42 to a flexible line 46 for a purpose described hereinafter. A U-shaped latch member 48 is pivoted as at 49 to the slidable member 38 on the opposite side of the upstanding member 42 from the spring 40, and the remote end of the guide rod 18 is provided with a catch 50 for engaging the latch member 48 when the slidable member 38 is pulled away from the flashlight 28 thereby tensioning the coil spring 40.

As best seen in Figure 6, the slidable member 38 engages a switch lever 52 which is pivotally mounted as at 55 on a bracket 54 depending from the base 14, and the pivotal member 52 is provided with a projecting finger portion 56 for engaging a U-shaped switch 58 thereby completing the electrical circuit for the flashlight 28. When the latch member 48 is engaged with the catch 50, the projecting portion 60 of the pivotal member 52 is engaged with the under portion of the slidable member 38, thereby disconnecting the projecting finger 56 and the switch 58. Upon release of the latch 48 from the catch 50, the projecting portion 62 of the pivotal member 52 is pushed downwardly by the undersurface of the sliding member 38 returning its terminal position as in Figure 1, thereby engaging the projecting finger 56 with the switch 58 thereby completing the electrical circuit for the flashlight 28 as the electrical wire 32 is connected to the switch 58 by suitable screw means 64. The projecting portions 60 and 62 pass through a suitable notch 66 in the base member 14 and are in the path of movement of the slidable member 38 on the horizontal guide rod 18.

A slidable member 68 surrounds the horizontal guide rod 20 and is provided with an upstanding hook-like member 70 at one end and a wire clip 72 at its other end. A looped member 74 is provided adjacent the wire clip 72, and a flexible line 76 is connected to the loop 74. A pulley 78 is positioned on the upstanding end member 16 remote from the flashlight 28 by a suitable bracket 80 and the flexible line 76 passes around the pulley 78 and is secured to the fastening means 44. As will be understood, the slidable member 38 is moved to a position so that the latch 48 engages the catch 50 and the slidable member 68 is moved to a position adjacent the flashlight 28 and upon release of the latch 50, the spring 40 moves the slidable member 38, the flexible line 76 and the slidable member 68 quickly to its terminal position. A buffer spring 82 is provided between the sliding member 68 and the upstanding portion 16 of the base 14.

Now referring specifically to Figure 3, it will be seen that a pivotal member 84 is pivoted to the horizontal guide rod 18 adjacent the pulley holding end and the pivotal member 84 pivotally mounted as at 85 is provided with a pair of projecting tongues 86 as seen in Figure 5 which pass over the catch 50, and an upstanding portion 88 having an eye member 90 at its upper end and receiving the flexible line 76. The flexible line 76 is provided with an enlarged portion 92 adjacent its connection to the slidable member 38 wherein the projection 92 engages the eye member 90 and pivots the member 84 so that the projecting tongues 86 engage the latch 48 and force it out of the catch 50, thereby releasing the sliding member 38 and permitting the sliding member 38 to move toward the flashlight member under the influence of the spring 40. The pivotal member 84 is normally held in its tripping position by a spring 94 adjustably secured to the upstanding portion 16 by a suitable eye member 96 and a secondary spring 98 of the leaf type engages the under portion of the tongues 86 thereby keeping the tongues 86 in constant engagement with the latch member 48 when it engages the catch 50. The friction between the latch member 48 and the catch 50 maintains the latch in engaged relation and the movement of the projection 92 and the line 76 overcomes this frictional resistance and releases the latch member 48. This movement of the line 76 is caused by the movement of the fishing line under the influence of a fish striking the hook.

Referring now specifically to Figures 1 and 2 of the drawings, it will be seen that the fishing rod 100 having a fishing line 102 thereon and a conventional reel 104 is positioned on the base 14 by a clamping member having a stationary jaw 106 and a movable jaw 108. The movable jaw is pivotally attached to the stationary jaw by a pivot axis 110, and the movable jaw 108 is urged towards the stationary jaw 106 by a pivotal plate 112 engaging a projecting portion 114 on the jaw 108 and slidably retained thereagainst by the use of a suitable loop member 116 and the plate 112 is held in pivotal relation to the stationary jaw 106 by the projecting studs 118 and the member is moved by the studs 118 by the set screw 120 passing through the member 112 and engaging the stationary jaw 106, thereby pivoting the plate 112 about its axis 118 and the pivotal jaw 108 about its pivotal axis 110, thereby clamping the fishing rod 100 to the base 14. Adjacent the remote end of the base from the clamping member 106 is positioned a U-shaped saddle member 122 for engaging the rod 100 and positioning the rod parallel to the base 14.

As best seen in Figure 3, the leaf spring 98 is adjustably engageable with the projecting tongues 86 by the use of a wing type set screw 124 abutting the undersurface of the leaf spring between the point of its engagement with the tongues 86 and the point of its securement to the base 14, as denoted by the numeral 126.

The operation of the device will be readily understood. The fishing rod 100 is positioned in the fishing device by inserting the butt end of the fishing rod 100 between the stationary jaw 106 and the movable jaw 108 and manipulating the clamp screw 120, thereby clamping the fishing rod between the jaws 108 and 106. Obviously, the U-shaped member 122 at the opposite end of the base saddles the fishing rod 100, thereby holding the fishing rod 100 in parallel relation to the base member with the reel 104 and the fishing line 102 in operative position. The fishing line 102 is then inserted under the wire clip 72 and the slidable member 68 and alongside the upstanding projection 70 thereby guiding the line 102. The sliding member 68 is then moved forwardly towards the flashlight 28 and the sliding member 38 is moved rearwardly towards the catch 50 and the latch 48 is positioned in the catch 50 thereby maintaining the device in its set position, as shown in Figure 2 in phantom and as shown in Figure 6. When a fish strikes the hook on the line 102, the slidable member 68 moves slightly forward, thereby engaging the projection 92 on the line 76 against the eye member 90, which pivots the member 84 about its pivot axis 85 thereby forcing the latch member 48 out of the catch 50, in an obvious manner. The spring 40 then quickly moves the sliding member 38 back towards the flashlight 28 and the connecting line 76 passing over the pulley 78 quickly moves the sliding member 68 away from the flashlight 28 thereby giving the fishing line 102 a quick jerk and setting the fishing hook securely in the fish. As the slidable member 38 moves towards the flashlight 28, the under portion of the slidable member 38 engages the projecting portion 62 of the pivotal member 52 and urges the projecting finger 56 into engagement with the switch 58 thereby completing the electrical circuit for the flashlight 28 and providing a signal for the fisherman as the flashlight 28 is lighted. The lighted flashlight indicates to the fisherman that a fish is on the hook and he may then be easily reeled into the boat or pier. Obviously, the particular amount of pull necessary to be exerted by the fish in order to disengage the latch 48 from the catch 50 may be adjusted by the adjusting means 96 and 124 and the various relationships between the elements may be set up as deemed necessary in each individual circumstance. The particular material used in the construction of this device is optional, and the substitution of well known equivalents is limited only to the terminology of the claims.

What is claimed as new is as follows:

1. A fishing device comprising a base, means for holding a fishing rod on said base, a first slidable means on said base for engaging a fishing line on the fishing rod, a second slidable means on said base, means on said second slidable means connected to the first slidable means, a latch member on said second slidable means to hold said second sliding means in one position, and a spring urging said second slidable means to a terminal position wherein said spring is unstressed, further means operatively associated with said first slidable means for releasing said latch whereby the fishing line is moved with said first slidable means in a jerking manner.

2. The structure as defined in claim 1 wherein said first slidable means includes a guide rod parallel to said base, and a hook member forming part of said first slidable means slidable on said rod, said hook member being adapted to engage the fishing line.

3. The structure as defined in claim 1 wherein said second slidable means includes a guide rod parallel to said base, a member slidable on said rod, spring means interconnecting said base and slidable member, a pivoted latch on said member, a catch on one end of said rod for engaging said latch, and means pivoted on said base for disengaging said latch, said pivoted means being operated by said spring means.

4. The structure as defined in claim 1 together with a light mounted on said base, an electric circuit for said light, and a pivoted switch in said circuit, said switch having projecting portions in the path of movement of said second slidable means wherein said circuit is closed when said latch is disengaged and said second slidable means is moved to said terminal position.

5. The structure as defined in claim 1 wherein said fishing rod holding means includes a stationary jaw, a pivotal jaw in opposition to said stationary jaw, and means for moving said pivotal jaw towards said stationary jaw, said moving means including a pivotal plate slidably secured to said pivotal jaw and having a pivot axis spaced from the pivot axis of said pivotal jaw and means for urging said pivot plate about its axis thereby urging said pivotal jaw towards said stationary jaw.

References Cited in the file of this patent

UNITED STATES PATENTS

| | | |
|---|---|---|
| 2,247,561 | Rowe | July 1, 1941 |
| 2,590,721 | Muth | Mar. 25, 1952 |
| 2,599,099 | Folker | June 3, 1952 |
| 2,603,900 | Kellett | July 22, 1952 |
| 2,612,713 | Jenkins | Oct. 7, 1952 |
| 2,661,563 | Adams, Jr., et al. | Dec. 8, 1953 |